Aug. 18, 1959 F. HENNIG 2,900,447

APPARATUS FOR CORRECTING THE EFFECT OF DISTURBANCES IN TELEGRAPHIC COMMUNICATION

Filed Sept. 22, 1954 2 Sheets-Sheet 1

Inventor:
Fritz Hennig.
By. [signature] Atty.

Inventor:
Fritz Hennig.
By. [signature] Atty.

2,900,447

APPARATUS FOR CORRECTING THE EFFECTS OF DISTURBANCES IN TELEGRAPHIC COMMUNICATION

Fritz Hennig, Munich-Solln, Germany, assignor to Siemens & Halske Aktiengesellschaft, Munich and Berlin, Germany, a German corporation Application September 22, 1954, Serial No. 457,746

Claims priority, application Germany September 24, 1953

3 Claims. (Cl. 178—23)

Figure 1:
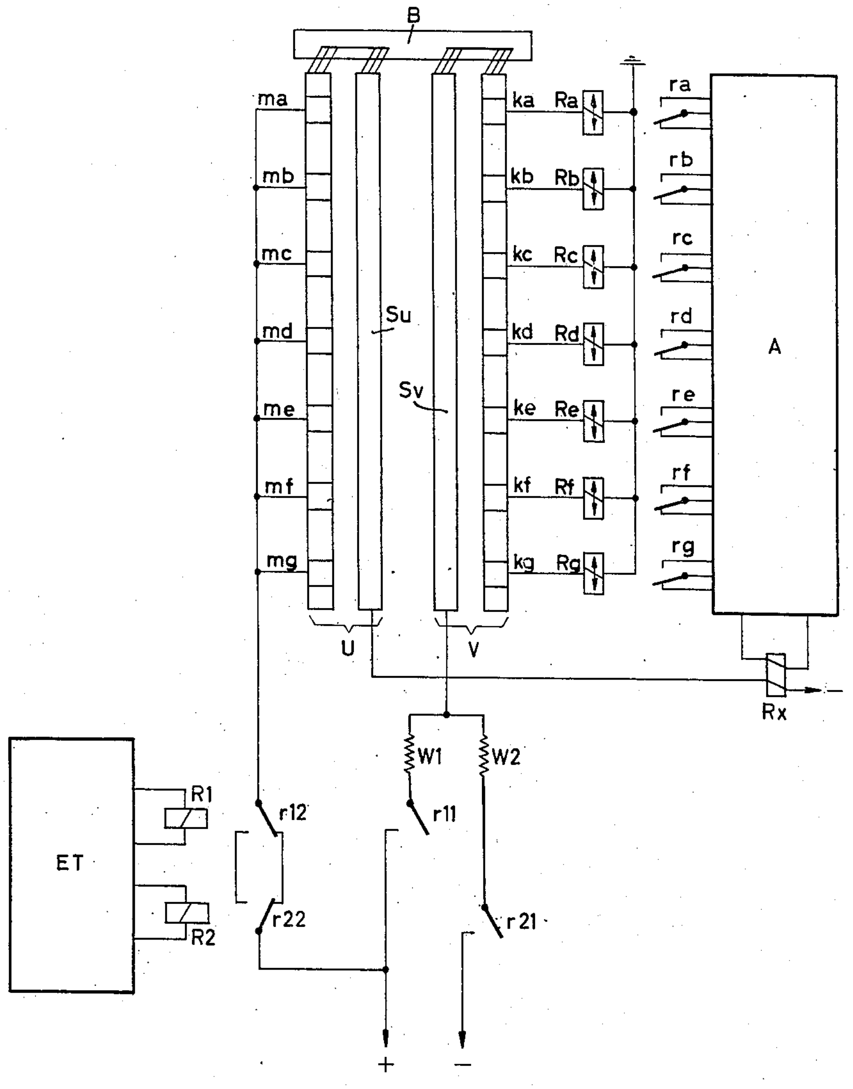

This invention relates to a method of and apparatus for correcting the effects of disturbances in telegraphic communication.

It is well known that telegraphic signals, particularly those in wireless transmission, may be garbled either by disturbances that delete a signal element, or by disturbances which produce a signal element that does not properly belong to the transmitted telegraphic signal. These disturbances have different effects in various types of transmission systems.

In the so-called single-current systems, the space current signal elements and the mark signal current elements of the telegraphic signals are marked or identified by causing a signal to be transmitted exclusively for current elements of one polarity, for example, for the space current elements, while no signal is transmitted with current elements of the opposite polarity, for example, with the mark signal current elements. Thus, for example, a system is known in which a predetermined frequency $f$ is transmitted to identify each space current element, while mark signal current elements are identified by gaps in the transmission. In this procedure, the disturbances have the effect of falsely converting a space current element into a mark signal current element or vice versa. The individual current elements do not lend themselves for ready detection of such disturbances. It is, however, possible to safeguard the individual telegraphic signals against disturbances, by the use of the well-known encoding and repeating procedures.

In the so-called dual current procedures, both the space and the mark signal current elements are identified by predetermined signals. Thus, for example, in the known dual tone or frequency-keying procedures, a predetermined frequency $f1$ is transmitted for each space current element, and a different predetermined frequency $f2$ is transmitted for each mark signal current element. In the absence of disturbances, only one of these frequencies can be received at a time. If however, the transmission is disturbed, two other conditions may arise, namely, both frequencies may occur simultaneously, or neither frequency may be present. In either case, the receiving device will not be affected in either direction. If the receiving device is a polarized relay, it will remain in that switching position in which it happens to be at that moment, thereby falsifying the corresponding current element or signal in fifty percent of all cases of disturbances of this type.

If the disturbance affects only one of the two frequencies, either both frequencies will appear simultaneously or both will be absent, as already pointed out. These disturbances can be readily detected in the individual current element. This kind of disturbance will hereinafter be referred to as "disturbance of the lower order."

If a disturbance affects both frequencies simultaneously, the result will be that either a space current element falsely appears as a mark signal current element, for example, frequency $f1$ will be converted into frequency $f2$; or the reverse occurs, with a mark signal current element appearing as a space current element, for example, frequency $f2$ being converted into frequency $f1$. Disturbances of this nature cannot be detected from the individual current element and invariably lead to false setting of the receiving device. This kind of disturbance will hereinafter be referred to as "disturbance of the higher order."

In single-current procedures, all disturbances will have the effects of disturbances of the higher order, as they cannot be detected in the individual current element. On the other hand, in dual-current operation, disturbances of either order will occur, although those of the higher order will be much less frequent.

Various methods of eliminating disturbances have already been proposed. The so-called element testing method is based on the fact that in dual-current transmission, only one of the frequencies $f1$ and $f2$ can be present at a time so long as there are no disturbances. If both frequencies are present or absent, this is detected in the element testing method, and the telegraphic signal to which the current step belongs, is identified as disturbed. It is evident that this method cannot detect disturbances of the higher order and falsified or garbled signals will therefore occur. In the transmission of signals by the single-current procedure, the element-testing method is accordingly entirely incapable of detecting disturbances.

Another known type of disturbance control may be referred to as repetitive control. This control utilizes for disturbance detection either the individual current element or the entire sequence of current elements constituting a telegraphic signal. Thus, in one known form of this control, each telegraphic signal is transmitted repetedly in succession; on the receiving side, the various transmissions of each signal are evaluated statistically, and that transmission is selected which has the greatest likelihood of being undisturbed. Repetitive controls or systems are capable of detecting disturbances of both lower and higher order. However, no repetitive method has thus far become known which discovers with complete certainty both types of disturbances. All known methods detect disturbances only with a certin degree of probability.

The known encoding systems likewise are capable of detecting disturbances both of the lower and the higher order, but again only with a certain degree of probability. In these systems, the telegraphic signals are translated into a disturbance-eliminating code, with the result that it is possible with a certain degree of probability to determine on the receiving side whether the received signal is or is not disturbed. Among these systems are some which will detect disturbances of both orders with about the same degree of probability.

All disturbance control systems that have heretofore become known, were designed with a view to definite transmission properties of the transmission path, or with a view to specific types of disturbances. This indeed permitted the creation of systems of correcting the effects of disturbances that were relatively efficient if certain conditions of transmission or certain types of disturbances were involved; but these systems were doomed to failure as soon as the transmission properties or types of disturbance were changed. It is apparent that these systems, tailored to specific conditions, are not of universal applicability.

It has already been proposed to combine various of these prior systems with each other with a view to enhancing the effectiveness of the individual systems of disturbance correction. However, none of the combination systems known heretofore has yielded satisfactory results. This is primarily due to the fact that disturbances have in the past been classified as "unipolar" and "bipolar"; the first term applying to disturbances that falsify only the current elements of one polarity during transmission, for example only the mark signal current elements; while the term "bipolar" was applied to disturbances which affect both space and mark signal current elements during transmission. When combining a system capable of detecting unipolar disturbances with one which is effective also against bipolar disturbances, improved disturbance control is obtained; however, the net result is merely the additive effect of the two component systems. One reason for the failure of these combination systems to be widely adopted, is that the required equipment is generally prohibitively complex; another reason is that the flow of signal communication is too greatly reduced by these systems.

The present invention has the object of providing apparatus for correcting the effects of disturbances, which affords more complete control than any of the known systems or any known combination thereof, without reducing the flow of signal communication.

The invention is based on the novel recognition that any combination of a system aimed at unipolar disturbances with a system directed against bipolar disturbances cannot accomplish the desired object; but that it is necessary—and this constitutes the essential feature of the present invention—to use a disturbance control system directed against disturbances of the lower order, together with one directed against disturbances of the higher order, and a disturbance indicating device which is actuated under the control of both disturbance control systems.

As disturbances of both orders can be detected only in the case of dual-current operation, the present invention is limited to such processes. It will be described hereinafter by way of example as embodied in a combination of an element testing system with the so-called seven-element discriminating system.

In the seven-element discriminating system, the telegraphic signals of the international code are converted into sequences of seven current elements, so selected that in each signal the ratio of space current elements to mark signal current elements is 3:4. Upon receipt of telegraphic signals, each is tested for this 3:4 ratio, and if a departure from this correct ratio is detected, the signal is identified as disturbed.

In accordance with another feature of the present invention, this system is supplemented with a device that examines each individual current step of a signal by the element-testing procedure, and in the event of disturbances of the lower order, this device likewise actuates the means for designating the signal as a disturbed one. In the seven-step discriminating method, identification or marking of the disturbed current element is effected by means of a signal relay.

Figure 2:
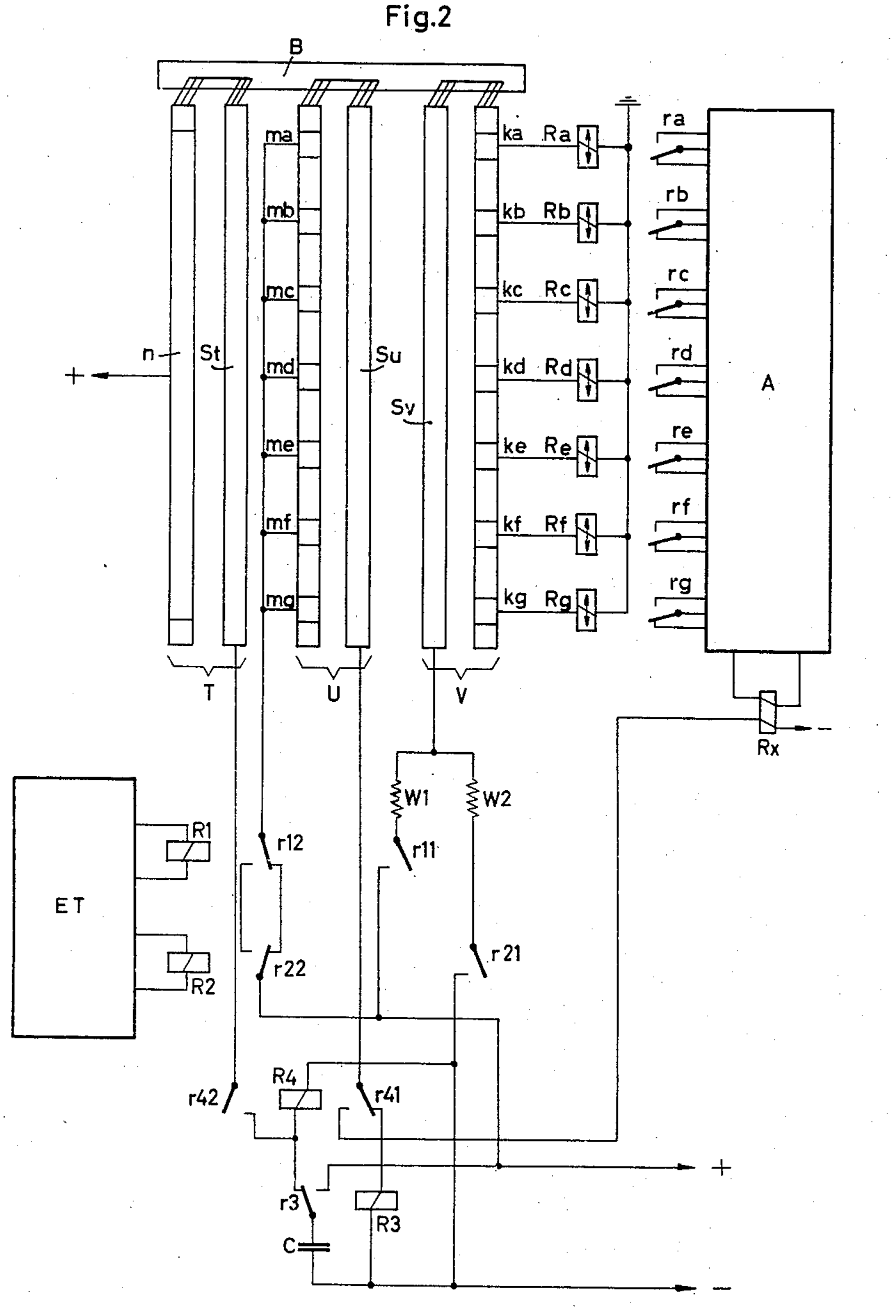

In the accompanying drawing,

Fig. 1 diagrammatically illustrates a circuit arrangement for carrying out the system of the present invention; and Fig. 2 diagrammatically illustrates a modification.

Referring to the circuit arrangement shown in Fig. 1, a known, diagrammatically indicated receiver ET determines which of the two possible frequencies *f*1 and *f*2 is contained in each step of the received teleprinter symbol. For example, the receiver ET may be of the type illustrated in U.S. Patent No. 2,715,667 issued to R. R. Turner, with the relays R1 and R2 connected to the rectifiers 11 and 11' of the patent. The frequency adjustment described in this patent, however, is of no importance in connection with the present invention. When the frequency *f*1, which shall be assumed to represent space current, is received, the receiver ET causes energization of a relay R1. When frequency *f*2, representing mark signal current, is received, relay R2 is energized.

In accordance with the frequencies received, energization of relay R1 applies a positive potential to its contact *r*11 while energization of relay R2 applies a negative potential to its contact *r*21. Contacts *r*11 and *r*21 are connected over the collector bar S*v* with the input side of a receiving distributor V through resistors W1 and W2, respectively. The distributor contacts *ka* to *kg*, which are successively connected with the collector bar S*v* by the brush B, scan the position of relays R1 and R2. For example, if relay R1 has been energized by frequency *f*1, contact *r*11 is connected to positive potential, and the distributor contact that happens to be scanning at that particular moment, ascertains this positive potential.

Assuming that contact *ka* is scanning, the positive potential is applied to storage relay R*a* and energizes the latter. In keeping with the seven current elements of each signal, there are provided seven scanning contacts *ka* to *kg*, with their seven respectively associated storage relays R*a* to R*g*. Contacts *ra* to *rg*, respectively associated with the relays R*a* to R*g*, are positioned in accordance with the polarity of the seven current elements received.

The discriminating device A, which is a known device, ascertains in known manner whether the ratio of space current to mark signal current in the received signal is 3:4. If the discriminating operation indicates that this correct ratio is not present, error indicating relay R*x* is energized. U.S. Patents Nos. 2,183,147 to J. B. Moore (Re. 23,028) and 2,153,737 to J. A. Spencer illustrate two forms of discriminating device "A" either of which could be employed in the circuits illustrated, the former patent disclosing a mechanical device while the latter patent illustrates an electrical device. Relay R*x* may be used in various known ways. Either, this relay marks the received signal as disturbed and causes the printing of a so-called smudge signal; or alternatively, the relay R*x* prevents recording of the received signal and automatically initiates repetition, by the transmitting station, of the signal last received.

Reception of frequencies *f*1 and *f*2 also causes actuation of contacts *r*12 and *r*22 by the respective relays R1 and R2. These contacts serve to detect disturbances of the lower order. If only one frequency, *f*1 or *f*2, is received, only one relay R1 or R2 will be energized. In that case, one of the contacts *r*12, *r*22 will occupy the position opposite to that shown in Fig. 1. This indicates that there is no disturbance of the lower order; and the positive potential applied to contact *r*22 is not switched through to the error indicating relay R*x*, so that the latter remains at rest. If, however, both frequencies *f*1 and *f*2 occur simultaneously, both relays R1 and R2 will be energized simultaneously, and both contacts *r*12 and *r*22 will occupy the positions opposite to those shown. Consequently, after closure operation of the interrupter U, that is, when the collector bar S*u* thereof has connected over the brush B with one of the interrupter contacts *ma* . . . *mg*, positive potential is applied through the two contacts *r*12, *r*22 to relay R*x*, whereby the latter is energized and initiates the operation explained above. Similar conditions apply when neither frequency *f*1 or *f*2 is received. In that case, neither relay R1 or R2 is energized, and the associated contacts *r*12 and *r*22 occupy the positions shown in Fig. 1, so that positive potential is again applied to the error indicating relay R*x*. Thus, this simple circuit permits of completely disposing of all disturbances of the lower order.

The interrupter U closes preferably simultaneously with the seven scanning contacts of the distributor V, as shown. Since, as is known, the individual current elements of telegraphic signals are not scanned for their entire length but only for a fraction thereof, for example, at the middle of the element, the result is attained that disturbances falling into the interval between scanning periods remain ineffective.

The interrupter U may also be used for singling out the desired channel of a multiple-channel apparatus.

In disturbances of the higher order, a current step of one polarity is falsely converted into one of opposite polarity. In this case, the findings of the discriminating device A determine in known manner a deviation from the correct ratio, whereby these disturbances of the higher order are likewise detected.

A certain drawback of the arrangement according to Fig. 1 resides in the fact that, just as when using the element-testing system alone, there will be an unduly large number of smudge signals or repeat orders. This disadvantage is eliminated in the circuit arrangement shown in Fig. 2.

In this modification, and in accordance with a further feature of this invention, the element testing device will cause printing of a smudge signal, or repeat transmission of the signal, only upon detecting at least two disturbances of the lower order within the same signal. In other words, a signal will be marked as disturbed when none or both possible frequencies are ascertained in at least two signal elements of the same sequence.

The circuit arrangement according to Fig. 2 is identical with that of Fig. 1 in so far as the receiving and discriminating components are concerned.

The circuit arrangement of Fig. 2 operates as follows:

If no disturbances of the lower order are received within a given frequency telegraphic signal, contact *r*41 will occupy the position shown. The positive potential at contact *r*22 will not be transmitted to relay R3 for the reasons explained with reference to Fig. 1, and relay R3 remains normal. When the first disturbance of the lower order arrives, the positive potential of contact *r*22 is transmitted through contacts *r*22, *r*12 and *r*41, to relay R3. Relay R3 energizes, and its contact *r*3 moves to the position opposite to that shown. This applies positive potential through contact *r*3 to capacitor C, whereby the latter is charged. After termination of this first disturbance, relay R3 restores, and contact *r*3 returns to the position shown. The positive charge of capacitor C then acts through contact *r*3 upon relay R4, and the latter energizes by the discharge of the capacitor. This moves the contacts *r*41 and *r*42 to positions opposite to those shown. Contact *r*42 closes over the interrupter T a holding circuit for relay R4 which persists for the duration of a teleprinter signal, that is, for the time when the collector bar S*t* of the interrupter T is connected with the contact portion *n*, relay R4 accordingly remaining operated after completion of the discharge of the capacitor. Contact *r*41 in its alternate position completes the circuit between contact *r*22 and trouble relay R*x*.

If there is no further disturbance of the lower order in the course of the same telegraphic signal, the positive potential on contact *r*22 will not be connected through to the relay R*x*, as explained with reference to Fig. 1. However, any further disturbance of the lower order will connect this potential to relay R*x* and energize the latter. At the end of each signal, the interrupter T opens, whereby relay R4 is restored and its contacts *r*41 and *r*42 are returned to their illustrated positions.

Calculations and experiments have shown that when employing the illustrated embodiments of the system of the present invention, the number of incidences of errors is lower by one or more tenth powers than when employing the seven-element discriminating method alone. If only the step testing system were used, the number of errors would be prohibitive. Notwithstanding the surprisingly large reduction of the number of errors, the required equipment is relatively simple. The circuit of Fig. 1 merely calls for the addition of one auxiliary interrupter contact, while the circuit of Fig. 2 requires two interruptor contacts and two relays.

The invention is not limited to the embodiments illustrated in Figs. 1 and 2, and these embodiments may accordingly be modified as desired. Thus, for example, it is possible to replace the relay circuits of Figs. 1 and 2 by tube circuits to obtain the operation in accordance with the principles discussed.

It is understood that distributors of the brush type have been shown only for the sake of convenient representation; other types of distributors may be used including distributors using cam actuated contacts and the like.

Changes may accordingly be made within the scope and spirit of the appended claims.

I claim:

1. In a telegraph system, a receiver for receiving code combinations formed by signal elements of one or the other of two possible current types and for also releasing a marker signal in case code combinations are disturbed, comprising a first circuit for ascertaining which of the two possible current types are contained in each signal element of a received code combination and responsive to simultaneous presence or absence of both types, a scanning circuit cooperatively connected with said first circuit for the successive scanning of the ascertained current types of the signal elements, a second circuit controlled by said scanning circuit responsive to disturbances in the received code combination due to interchange of current types of a signal element, actuatable if the received code combination contains less than a predetermined number of signal elements of one or the other of the two possible current types, and means controlled by said first circuit and also by said second circuit for marking the signal to be printed if the corresponding received code combination is so disturbed.

2. A system and cooperation of parts according to claim 1, comprising circuit means controlled by said first circuit operatively related to said marking means for restricting operation of the latter until a plurality of disturbances within a single code combination have taken place.

3. A system and cooperation of parts according to claim 2, comprising means for setting the circuit arrangement controlled by said first circuit to its initial position after completed scanning of each received code combination by said scanning means.

References Cited in the file of this patent

UNITED STATES PATENTS

| | | |
|---|---|---|
| Re. 22,394 | Moore et al. | Nov. 23, 1943 |
| 1,972,985 | Gardner | Sept. 11, 1934 |
| 2,119,196 | Bakker et al. | May 31, 1938 |
| 2,153,737 | Spencer | Apr. 11, 1939 |
| 2,512,038 | Potts | June 20, 1950 |
| 2,653,996 | Wright | Sept. 29, 1953 |